United States Patent [19]

Gliksman et al.

[11] Patent Number: 5,002,744

[45] Date of Patent: Mar. 26, 1991

[54] METHOD FOR DEFLUORINATING WET PROCESS PHOSPHORIC ACID

[75] Inventors: Joseph E. Gliksman, Valrico; Dennis H. Michalski; Ronald L. Wiegel, both of Lakeland, all of Fla.

[73] Assignee: IMC Fertilizer, Inc., Northbrook, Ill.

[21] Appl. No.: 522,109

[22] Filed: May 11, 1990

[51] Int. Cl.$^5$ .............................................. C01B 25/16
[52] U.S. Cl. .................................. 423/321 R; 423/320
[58] Field of Search .................. 423/317, 321 R, 319, 423/320

[56] References Cited

U.S. PATENT DOCUMENTS

| | | | |
|---|---|---|---|
| 2,123,785 | 7/1938 | Knox | 23/165 |
| 2,933,372 | 4/1960 | Manning | 423/321 R |
| 2,987,376 | 6/1961 | Gloss | 23/165 |
| 3,091,513 | 5/1963 | Parish | 23/165 |
| 3,151,941 | 10/1964 | Hollingsworth | 23/165 |
| 3,193,351 | 7/1965 | Miller | 23/165 |
| 3,273,713 | 9/1966 | Parish | 23/165 |
| 3,429,663 | 2/1969 | Shearon | 23/165 |
| 3,718,729 | 2/1973 | Amin | 423/321 R |
| 3,800,029 | 3/1974 | Omoto | 423/321 R |
| 4,000,067 | 12/1976 | Smelley | 210/42 R |
| 4,046,860 | 9/1977 | Kidde | 423/341 |
| 4,055,626 | 10/1977 | Drechsel | 423/320 |
| 4,330,517 | 5/1982 | Michalski | 423/321 R |
| 4,347,228 | 8/1982 | Wolstein | 423/321 R |
| 4,676,963 | 6/1987 | Khanna | 423/315 |

FOREIGN PATENT DOCUMENTS

| | | |
|---|---|---|
| 741380 | 6/1970 | Belgium . |
| 7605359 | 7/1978 | France . |
| 8111229 | 12/1982 | France . |
| 899458 | 1/1982 | U.S.S.R. . |

*Primary Examiner*—Gregory A. Heller
*Attorney, Agent, or Firm*—Banner, Birch, McKie and Beckett

[57] ABSTRACT

A method for defluorinating wet process phosphoric acid. Phosphatic waste clay from phosphate rock beneficiation is mixed with the wet process phosphoric acid. The mixture is heated for a time sufficient to remove fluorine from the acid as gaseous silicon tetrafluoride. Phosphate is liberated from the phosphatic waste clay and thus is recovered in the defluorinated wet process phosphoric acid.

19 Claims, No Drawings

METHOD FOR DEFLUORINATING WET PROCESS PHOSPHORIC ACID

BACKGROUND OF THE INVENTION

1. Field of the Invention

This invention relates to a method for defluorinating wet process phosphoric acid. More particularly, this invention relates to a method for defluorinating wet process phosphoric acid using phosphatic waste clay from the beneficiation of phosphate rock.

2. Description of Related Art

Wet process phosphoric acid, such as that obtained from phosphate rock or ore deposits in central Florida, contains fluorine, e.g., in fluorine compounds, in amounts sufficient to make it unsuitable for use in animal feed additives, human food additives, or as a raw material for the preparation of phosphate compounds used in detergent formulations. In addition, the presence of fluorine in the wet process phosphoric acid causes post-precipitation of complex fluorides which hamper production of merchant acid grades of phosphoric acid, i.e., concentrated acids. Environmental considerations also may require the removal of fluorine from phosphoric acid.

Various methods of defluorination have been proposed. Precipitation with salts of insoluble fluorine-containing compounds is not very useful, because substantial quantities of phosphoric anhydride also are precipitated. These precipitates represent a significant economic loss of phosphate values. Vacuum concentration has been tried, but does not remove enough fluorine to warrant the expense.

A more widely practiced process for removing fluorine from wet process phosphoric acid comprises the addition of silica, such as diatomaceous earth, to concentrated 54 percent $P_2O_5$ acid. Diatomaceous earth (tripolite, kieselguhr, for example) is formed from the siliceous shells of diatoms and is found in the beds of ancient seas in such places as the Great Basin of Nevada. The material is also used for filtering, as an adsorbent, as an insulating material, and as an abrasive in soaps. These competing uses have a significant effect on the cost of diatomaceous earth. The cost also is increased by the cost of transporting it to phosphate rock mine sites.

One such process is disclosed in U.S. Pat. No. 2,987,376. A slurry of phosphoric acid and between about 0.3 and 1.2 wt. percent colloidal silica having a specific surface area of at least about 25 square meters per gram is boiled to cause fluorine to be evolved. However, as disclosed in the patent, this method of defluorination is not satisfactory if the acid is dilute, i.e., has a $P_2O_5$ concentration below about 30 wt. percent, because defluorination by boiling is slow at these low concentrations. Dilute acid must be concentrated, typically by boiling off water, to between about 50 and 60 wt. percent $P_2O_5$, at which concentration the method becomes useful.

U.S. Pat. No. 4,046,860 discloses a method of defluorinating and concentrating wet process phosphoric acid which comprises the addition of about 2 percent by weight colloidal silica to a fluorine-containing phosphoric acid (28–32 percent $P_2O_5$), heating under vacuum (50–180 mm Hg absolute) to a temperature of about 190° F., removing the concentrated phosphoric acid stream low in fluorine content, and separately removing a vapor stream containing silicon tetrafluoride ($SiF_4$). The silicon tetrafluoride then is scrubbed with a solution containing ammonium bifluoride or ammonium fluoride, and optionally, fluosilicic acid or ammonium fluosilicate. The aqueous solution discharged from the scrubber is neutralized with ammonia to precipitate silica and to convert all the fluorine-containing compounds to ammonium fluoride. The silica is washed and recycled.

As described in U.S. Pat. No. 3,800,029, sodium fluosilicate can be recovered from wet process phosphoric acid by adding a sodium compound, such as caustic soda, or by adding a sodium salt to phosphoric acid which does not contain substantial amounts of fluosilicic acid to form a solution containing phosphoric acid and sodium dihydrogen phosphate. This aqueous solution then is added to wet process phosphoric acid containing fluosilicic acid, and the resulting sodium fluosilicate crystals are separated from the defluorinated phosphoric acid.

Fluoride-free phosphoric acid also is said to be produced by the method described in U.S. Pat. No. 4,055,626. Acidulation of phosphate rock with sulfuric acid is conducted in the presence of added potassium (e.g., $KHSO_4$, $K_2SO_4$, $KH_2PO_4$, or $KOH$) and additional silica to precipitate fluorides and silica as potassium silicofluoride.

French Patent Application No. 76-05359 discloses a process for simultaneous clarification and defluorination of phosphoric acid solution wherein finely divided bleaching earth is mixed with the acid solution, agitated for a period sufficient to ensure reaction of fluoride in phosphoric acid with the silica in the bleaching earth and the adsorption of organic substituents in the acid onto the earth particles. Typically, up to about 30 minutes agitation is allowed. Suitable bleaching earths include colloidal clays (smectic clay, bentonites, and polygorskites) and clays having a high proportion of siliceous material, such as montmorillonite or attapulgite.

Clarified and defluorinated phosphoric acid is separated from the bleaching earth by filtration or by decantation over a period of between about three and ten days. Higher temperatures promote defluorination, so, typically, the temperature is maintained between about 50° and 90° C. Five to 30 grams of clay is utilized per kilogram of acid treated to ensure effective defluorination without wasting defluorinating agent. In treated acid, a typical carbon concentration is less than about 0.20 wt. percent and fluorine content is less than about 0.25 wt. percent after a treatment of about three days.

French Application for Certificate of Addition 81-11229 discloses that practice of the method of FR No. 76-05359 with hydrated clay reduces the quantity of clay required by a factor of about 3 and reduces the period required for treatment to a minimum of about 24 hours.

These methods are unsatisfactory, however, for two reasons. First, they require the use of bleaching earths, which suffer the same disabilities as diatomaceous earth. Further, a period of at least about 24 hours is required to obtain the described fluorine concentration.

In the method described in U.S. Pat. No. 4,330,517, fumes (dust) from submerged arc furnaces used to make silicon alloys with metals such as iron and chrome are utilized in place of, for example, diatomaceous earth, to defluorinate wet process phosphoric acid. These fumes contain silica in fine particulate form, and are quick, effective defluorinating agents. Unfortunately, these fumes originate from submerged arc furnaces of the type described above, which are not generally located in the vicinity of the wet process acid facility. Therefore, these fumes typically must be transported to the site where wet process acid is defluorinated.

U.S. Pat. No. 4,000,067 discloses a method for rapid sedimentation of fine particles from aqueous suspensions of phosphatic waste clays by adding fluoride. In particular, the patent discloses a method for reacting, under acidic conditions, a fluoride ion-containing material with phosphatic waste clays from phosphate rock beneficiation to rapidly settle particles. Phosphatic waste clays, said to be suitably treated by the method, include those suspensions which contain siliceous materials, such as attapulgite, montmorillonite, and kaolinite clays. Suitable fluoride iron-containing materials have a pH between about 0.5 and 5, and hydrofluoric acid is preferred.

SUMMARY OF THE INVENTION

The invention relates to a method for defluorinating wet process phosphoric acid of any strength or concentration. Phosphatic waste clay from phosphate rock beneficiation is mixed with the wet process phosphoric acid. The mixture is heated for a time sufficient to remove fluorine from the acid as gaseous $SiF_4$. Phosphorus is liberated from the phosphatic waste clay as it reacts, and thus is recovered in the defluorinated wet process phosphoric acid.

DETAILED DESCRIPTION OF THE INVENTION

This invention is based on the discovery that phosphatic waste clays from phosphate rock beneficiation quickly and efficiently defluorinate wet process phosphoric acid. These phosphatic waste clays, which constitute a waste product from the beneficiation of phosphate rock, typically are comprised of silicate, clays (containing aluminum), minerals (containing phosphates and metal-containing compounds), and water. Skilled practitioners recognize that the aluminum content of such phosphatic waste clays is not insignificant. In fact, the level is usually sufficient to lead one to the expectation that these phosphatic waste clays would not be suitable defluorination agents in steam defluorination because an aluminum-containing clay would be expected to retard the defluorination reaction. Surprisingly, the inventors have discovered that these phosphatic waste clays are unexpectedly efficient agents which quickly remove fluoride from any concentration of wet process phosphoric acid. The method of the invention also provides as an additional benefit a method for recovering, as phosphoric acid solution, some of the phosphate in the phosphatic waste clay.

In accordance with the method of the invention, wet process phosphoric acid and a quantity of phosphatic waste clay produced by the beneficiation of phosphate rock are stirred together to form a suspension or a slurry. The temperature of the suspension is raised, preferably to about the boiling point of the slurry, and the slurry is maintained at an elevated temperature for a time sufficient to evolve the desired quantity of fluoride and reduce the fluoride concentration in the acid. Thereafter, any solids remaining in the acid can be removed by decantation or centrifugation.

Phosphoric acid produced by reacting phosphate rock with a mineral acid such as sulfuric acid is known as wet process phosphoric acid. Raw, i.e., untreated, phosphoric acid recovered from a wet process method of producing phosphoric acid typically contains solid particulates. Such acid often is called "run of plant (ROP)" acid. The particulates contain fluorine in compositions which contain metals, such as ralstonite, as well as metals such as iron, magnesium, and aluminum, in other metal-containing compounds. ROP acid can be allowed to settle, and the underflow from such a settling step is treated, such as by filtration or centrifugation, to essentially separate the solid particulates from phosphoric acid solution. The supernatant or filtrate from this underflow is known as clarified phosphoric acid or as merchant acid (at about 54 percent $P_2O_5$ concentration). Both ROP and merchant acids suitably are treated in accordance with the method of the invention.

Phosphoric acid is an aqueous solution of $P_2O_5$ containing various impurities, such as F, CaO, MgO, $Fe_2O_3$, $SO_4$, and $Al_2O_3$. Although wet process phosphoric acid can have any strength or concentration, the concentration of $P_2O_5$ in solution typically ranges between about 20 and 60 wt. percent. Skilled practitioners recognize that $P_2O_5$ concentrations higher than about 58 percent may form gelatinous masses of pyrophosphates. Acid solutions having $P_2O_5$ concentrations less than about 35 wt. percent typically are known as dilute acids. Acid solutions comprising at least about 50 wt. percent $P_2O_5$ typically are called concentrated acids. In particular, essentially solid-free (clarified or centrifuged) acid having a $P_2O_5$ concentration of about 54 wt. percent is known as "Merchant Acid."

Acid of any strength or concentration which contains fluoride can be treated in accordance with the method of the invention. Although the method of this invention may be utilized to defluorinate ROP and merchant acid having a $P_2O_5$ concentration less than about 30 percent, the reaction (defluorination) rate is slow. Therefore, treatment of such dilute acids may not be economically justified. However, the economics are substantially improved if the acid concentration is greater than about 40 percent $P_2O_5$, because silicon tetrafluoride is evolved if the acid contains a quantity of silica sufficient to form gaseous silicon tetrafluoride during concentration of dilute acid, typically by sparging superheated steam through the acid. As skilled practitioners recognize, the reaction rate will increase as the silica-containing acid is concentrated, i.e., as the concentrations of silica and acid increase. Therefore, one may prefer to concentrate the acid to about 40 percent $P_2O_5$ by sparging with superheated steam before utilizing the method of the invention.

Phosphate rock, such as rock used in the wet process of producing phosphoric acid, contains siliceous material in various forms. Beneficiation of the raw mined rock using, for example, gravity separation and flotation techniques preparatory to subjecting it to the wet process reaction, produces a substantial amount of by-product material in the form of a slurry, also known as phosphatic waste clay. This slurry generally comprises an aqueous fine particle suspension containing various siliceous materials which are a combination of silicate materials, for example, sand, attapulgite, montmorillonite, feldspars, and kaolinite clays. Because of the intricate network of the various clay materials within the phosphatic waste clay, the slurry is highly resistant to settling. Therefore, this watery suspension typically is transferred to a settling pond and permitted to stand for a long period of time in the hope that settling eventually will occur. However, ecological concerns have spurred research to discover methods of efficiently treating such phosphatic waste clays.

Any phosphatic waste clays which contain silica in a form which will react with fluoride in the acid to form gaseous silicon tetrafluoride can be utilized in the method of this invention. For the purpose of this invention, the word "silica" encompasses siliceous material containing silica which reacts with fluorine. Such siliceous material also is referred to as "reactive silicate" or simply "silicates". For example, phosphatic waste slurries obtained from phosphate rock beneficiation may contain particles in addition to clay, such as sand and feldspars, which settle more quickly than the remaining particulates. The slurry may separate when stored for a sufficient period, with some particles settling out of suspension. The supernatant then is a suspension having a solids concentration and composition different from the original slurry. Either suspension may be utilized in the method of the invention.

The inventors have discovered that these phosphatic waste clays may be utilized to defluorinate wet process phosphoric acid, as described herein. Further, when utilized in the method of the invention, not only is this waste fraction disposed of, thereby avoiding long settling periods and the contaminant costs associated with the required large settling ponds, but also the phosphate value in the phosphatic waste clays is recovered as phosphoric acid solution.

The composition of the phosphatic waste slurry can vary in accordance with the conditions utilized during the beneficiation of phosphate rock, and is related to the composition of the phosphate rock from which the acid was produced. Therefore, the solids content can be adjusted by dilution with water or by removal of water. For example, water can be removed from the suspension by evaporation or by decantation of supernatant from gravity-settled or centrifuged phosphatic waste slurry (dewatering). Settling can also be utilized to remove some particles, as described above.

Typically, phosphatic waste clay slurries have a solids concentration of up to about 25 wt. percent, more typically up to about 20 wt. percent. The composition of the solids varies, depending not only on the composition of the phosphate rock from which the acid was derived but also upon the conditions under which the rock was beneficiated. Generally, the phosphate concentration (expressed as wt. percent $P_2O_5$) in the solid fraction of the phosphatic waste clay is between about 5 and 15 wt. percent, the silicate concentration (as $SiO_2$) between about 25 and 50 wt. percent, and the alumina concentration (as $Al_2O_3$) between about 10 and 20 wt. percent, with other solids comprising the remainder. However, any phosphatic waste clay which contains reactive silicates, at any degree of dilution, may be utilized in the method of the invention.

In accordance with the method of the invention, acid is mixed with phosphatic waste clay and heated. Silicates in the phosphatic waste clay are fully hydrated, and therefore are mixed into the aqueous acid solution without the difficulty often encountered when mixing difficultly-wetted dry silica-containing material such as ferrosilicon dust. Therefore, these phosphatic waste clays are easily mixed with phosphoric acid to form a mixture.

Any method of heating the mixture may be utilized. The temperature is maintained for a time sufficient to achieve the desired degree of defluorination of the acid. The length of the period required to achieve a particular fluoride concentration will, of course, depend upon the concentration of fluoride initially present in the acid, the quantity of phosphatic waste clay added and concentration of silicates therein, and the temperature at which the evolution of $SiF_4$ is carried out. The extent of defluorination also is limited by these factors. However, with the guidance provided by the specification, skilled practitioners will be able to determine an appropriate period length to achieve the desired degree of fluoride concentration reduction. Typically, this period will not be longer than the period required to defluorinate utilizing an equivalent quantity of ferrosilicon dust in accordance with the method of U.S. Pat. No. 4,330,517, the quickest defluorination method known to the inventors prior to this invention.

Typically, the method of the invention is practiced at subatmospheric pressure, i.e., at a vacuum of at least about 20 inches Hg, preferably at a vacuum of at least about 23 inches Hg, more preferably at least about 25 inches Hg vacuum, and most preferably at least about 27 inches Hg vacuum.

The rate at which fluoride is removed from the acid/phosphatic waste clay mixture increases as temperature increases. Therefore, at a most preferred vacuum of at least about 27 inches Hg, the temperature of the mixture is increased to at least about 200° F., preferably between about 210° F. and the boiling point of the acid/phosphatic waste clay mixture at the operating pressure, and most preferably at the boiling point of the mixture at the operating pressure. The boiling point temperature at the operating pressure will be utilized to achieve defluorination of the acid within the shortest period.

Fluoride is more difficult to remove from ROP acid than from merchant acid. As described above, ROP acid contains fluorine-containing particles. Removal of fluorine from these particles is more difficult than removal of free fluoride ions and the smaller particulates, i.e., in the form fluoride is present in merchant acid. Increasing the size of a fluorine-containing particle decreases both the rate at which fluorine is removed from the particle and the difference in defluorination rates between known defluorination methods and the method of the invention. Although the inventors do not wish to be bound by this theory, it is believed that the removal rate advantage is decreased because the rate becomes limited by mass-transfer considerations rather than by reaction rate. Thus, the reaction rate advantage enjoyed by phosphatic waste clays is masked by mass-transfer considerations, which are not affected by the identity of the defluorinating agent.

The quantity of phosphatic waste clay added to the acid typically is that quantity required to introduce at least about the stoichiometric amount of silica in accordance with the following reaction:

$$4HF + SiO_2 \rightarrow SiF_4 + 2H_2O \qquad (I)$$

Therefore, it is preferred to introduce at least about a stoichiometric quantity of silica to ensure that the fluoride concentration is reduced to an acceptable level, e.g., to a P/F weight ratio of at least about 100 in concentrated (50-60 wt. percent $P_2O_5$) acid. For a typical phosphatic waste clay having a solids content of 20 percent, of which about 45 percent constitutes silica, about 8.75 pounds of aqueous phosphatic waste clay is added per pound of F in the wet process acid. A less than stoichiometric quantity of phosphatic waste clays (calculated based on $SiO_2$ content) can be utilized if a P/F weight ratio lower than 100 is acceptable.

Skilled practitioners recognize that use of a stoichiometric excess of silica will not significantly shorten the time required to defluorinate acid. However, in the method of the invention, use of a quantity of phosphatic waste clays in excess of the stoichiometric requirement typically will achieve a P/F weight ratio in the treated acid of at least about 100 more quickly than will use of the stoichiometric amount. Thus, a stoichiometric excess of between about 5 and 100 percent, preferably between about 20 and 80 percent, and more preferably between about 35 and 65 percent, may be utilized to ensure that a P/F ratio of at least about 100 is achieved and to accelerate the defluorination reaction and shorten the time required to defluorinate.

As described above, the composition of phosphatic waste clays is variable. Therefore, the quantity of phosphatic waste clay to be introduced must be determined based on an analysis of the phosphatic waste clay and the quantity of silica which is to be added. Because a significant fraction of the phosphatic waste clay suspension is water, the addition of a significant quantity of water to the acid with the solids is unavoidable. Typically, between about 5 and 20 pounds of water are added per pound of silica.

Skilled practitioners recognize that water evaporates from the acid/phosphatic waste clay mixture during treatment at a rate dependent upon the conditions under which defluorination is practiced, i.e., dependent upon the pressure over and temperature of the mixture. Water is added to the defluorinated acid to replace the quantity evaporated if the $P_2O_5$ concentration of the acid is to remain unchanged.

If the temperature at which the method of this invention is practiced is the boiling point temperature, between about 0.5 and 1.5 lbs. of water per lb. of $P_2O_5$ typically is added during the time required to complete defluorination to maintain approximately the same $P_2O_5$ concentration. Of course, evaporation loss per hour is less at temperatures lower than the boiling point, but defluorination takes longer at such conditions. The water introduced as part of the phosphatic waste clay slurry is a diluent which is taken into account when calculating the quantity of water added. The phosphate recovered from the phosphatic waste clay also is taken into account when calculating the $P_2O_5$ concentration. With the guidance provided herein, skilled practitioners can determine the quantity of water which must be added to achieve the desired $P_2O_5$ concentration in acid treated in accordance with the method of the invention.

When the desired fluoride concentration or P/F weight ratio has been reached, the treated acid may be further treated. For example, the acid may be decanted or centrifuged to remove any insoluble components, or adjuvants may be added. Typically, the P/F weight ratio, rather than the concentration of a single component, is utilized to determine the degree of completion of defluorination to ensure that changes in concentration caused by failure to replace evaporated water do not affect the data. Usually, a P/F ratio of about 100 at a $P_2O_5$ concentration of about 54 percent signals that defluorination is essentially complete.

The inventors have discovered that phosphatic waste clay is a quick and efficient defluorinating agent, even in view of its normally high aluminum content, which would be expected to retard the defluorination reaction. Although the inventors do not wish to be bound by any theory, it is believed that the slime is a more efficient defluorination agent than other silica forms, such as ferrosilicon dust, diatomaceous earth, silica, and the like, in part because the silica in the phosphatic waste clay slurry is fully hydrated. Further, the method of the invention affords the opportunity to recover phosphate from phosphatic waste clays which otherwise would be wasted.

The following examples are intended to further illustrate, and not to limit, the scope of the subject invention. Rather, the scope of the invention is defined by the appended claims.

EXAMPLES

Each of the following examples comprises a comparison of the method of the invention to the method of defluorination utilizing ferrosilicon dust, as described in U.S. Pat. No. 4,330,517. In the first two examples, a quantity of phosphoric acid was divided into portions, and each portion was mixed with a multiple of the stoichiometric quantity of silica required to react with and remove fluoride in accordance with reaction formula I above. Different acid solutions were used in the third example for each treatment. The slurry was heated to boiling. The concentrations of $P_2O_5$ and F in the slurry were determined hourly, and the P/F wt. ratio was calculated. Defluorination is considered complete when the P/F ratio exceeds 100.

EXAMPLE 1

A merchant acid was defluorinated with a stoichiometric quantity of ferrosilicon dust and with 1.5 times the stoichiometric quantity of phosphatic waste clay from phosphate rock beneficiation. The ferrosilicon dust comprised 88.5 wt. percent $SiO_2$; the phosphatic waste clay had the following chemical analysis:

| Compound | Wt. Percent |
|---|---|
| Water | 80.2 |
| $P_2O_5$ | 1.84 |
| $SiO_2$ | 9.16 |
| $Al_2O_3$ | 2.92 |
| Other | 5.88 |

Therefore, 55.7 pounds of acid was treated with 0.49 pounds of ferrosilicon dust, while 52.3 pounds of acid was treated with 6.65 lbs. of phosphatic waste clay.

The periodic history of the P/F ratio was as follows:

| Time (hrs) | Acid Treated With Ferrosilicon Dust | | | Acid Treated With Phosphatic Waste Clay | | |
|---|---|---|---|---|---|---|
| | $P_2O_5$ | F | P/F | $P_2O_5$ | F | P/F |
| 0.0 | 54.89 | 1.01 | 23.7 | 54.89 | 1.01 | 23.7 |
| 1.0 | 56.97 | 0.50 | 49.7 | 54.79 | 0.40 | 59.8 |
| 2.0 | 57.20 | 0.47 | 53.1 | 56.53 | 0.33 | 74.8 |
| 3.0 | 58.23 | 0.44 | 57.8 | 55.65 | 0.28 | 86.7 |
| 4.0 | 58.27 | 0.36 | 70.6 | 55.27 | 0.23 | 105 |
| 5.0 | 56.79 | 0.33 | 75.1 | 55.59 | 0.21 | 116 |
| 6.0 | 56.12 | 0.29 | 84.4 | 56.02 | 0.19 | 129 |
| 7.0 | 56.39 | 0.28 | 87.9 | 55.83 | 0.17 | 143 |
| 8.0 | 56.44 | 0.26 | 94.7 | 55.75 | 0.15 | 162 |
| 9.0 | 56.24 | 0.25 | 98.2 | 55.26 | 0.13 | 186 |

Analysis of the starting merchant acid and resulting treated acids after 9.0 hours of treatment were as follows:

|  | Starting Acid | Acid Treated With Ferrosilicon Dust | Acid Treated With Phosphatic Waste Clay |
|---|---|---|---|
| $P_2O_5$, wt % | 54.89 | 56.24 | 55.26 |
| F, wt. % | 1.01 | 0.25 | 0.13 |
| CaO, wt % | 0.06 | 0.11 | 0.27 |
| $Al_2O_3$, wt % | 1.66 | 1.59 | 2.18 |
| $Fe_2O_3$, wt % | 1.06 | 1.21 | 1.22 |
| MgO, wt % | 0.70 | 0.75 | 0.82 |

This data illustrates the increase in alumina and calcium concentration due to use of the phosphatic waste clay slurry.

The Example as a whole illustrates the surprising effectiveness of defluorination of phosphoric acid in accordance with the method of the invention, especially in view of the high aluminum content of the phosphatic waste clay. The quantity of $P_2O_5$ recovered in accordance with the method of the invention is about 1.5 percent greater than the initial quantity, calculated on the basis that all the $P_2O_5$ in the phosphatic waste clay dissolved into the acid. No solid remaining from the phosphatic waste clay remained in the filtered acid.

EXAMPLE 2

The merchant acid of Example 1 was treated with a stoichiometric quantity of phosphatic waste clay (4.15 lbs. of phosphatic waste clay used to treat 52.4 lbs. acid) having the following chemical analysis:

| Compound | Wt. Percent |
|---|---|
| Water | 77.6 |
| $P_2O_5$ | 3.28 |
| $SiO_2$ | 9.81 |
| $Al_2O_3$ | 3.61 |
| Other | 5.70 |

The periodic history of the P/F ratio was as follows:

| Time | Acid Treated With Ferrosilicon Dust (Example 1) | | | Acid Treated With Phosphatic Waste Clay | | |
|---|---|---|---|---|---|---|
| (hrs) | $P_2O_5$ | F | P/F | $P_2O_5$ | F | P/F |
| 0.0 | 54.89 | 1.01 | 23.7 | 54.89 | 1.01 | 23.7 |
| 1.0 | 56.97 | 0.50 | 49.7 | 53.01 | 0.46 | 50.3 |
| 2.0 | 57.20 | 0.47 | 53.1 | 55.39 | 0.35 | 69.1 |
| 3.0 | 58.23 | 0.44 | 57.8 | 55.67 | 0.31 | 78.4 |
| 4.0 | 58.27 | 0.36 | 70.6 | 55.32 | 0.27 | 89.4 |
| 5.0 | 56.79 | 0.33 | 75.1 | 55.33 | 0.26 | 92.9 |
| 6.0 | 56.12 | 0.29 | 84.4 | 55.31 | 0.25 | 96.5 |
| 7.0 | 56.39 | 0.28 | 87.9 | 55.50 | 0.23 | 105 |
| 8.0 | 56.44 | 0.26 | 94.7 | 55.99 | 0.23 | 106 |
| 9.0 | 56.24 | 0.25 | 98.2 | 55.62 | 0.21 | 116 |

This data illustrates that, with equivalent (stoichiometric) quantities of defluorination agent, the method of the invention was more effective.

Chemical analysis of the starting and defluorinated acids were as follows:

|  | Starting Acid | Acid Treated With Ferrosilicon Dust | Acid Treated With Phosphatic Waste Clay |
|---|---|---|---|
| $P_2O_5$, wt % | 54.89 | 56.24 | 55.62 |
| F, wt. % | 1.01 | 0.25 | 0.21 |
| CaO, wt % | 0.06 | 0.11 | 0.37 |
| $Al_2O_3$, wt % | 1.66 | 1.59 | 1.91 |
| $Fe_2O_3$, wt % | 1.06 | 1.21 | 1.31 |
| MgO, wt % | 0.70 | 0.75 | 0.85 |

Again, the data as a whole indicates the superior defluorination effectiveness of the method of the invention. Also, the quantity of $P_2O_5$ was increased by about 1 percent, calculated on the same basis described in Example 1.

EXAMPLE 3

ROP acid was treated as described above with 1.5 times the stoichiometric quantity of ferrosilicon dust, while a second ROP acid was treated with 1.5 times the stoichiometric quantity (based on silica content) of the phosphatic waste clay of Example 2. Thus, 50.9 lbs. of acid was treated with 0.9 lbs. of ferrosilicon dust, and 46.4 lbs. of acid was treated with 7.48 lbs. of phosphatic waste clay.

The periodic history of the P/F ratio was as follows:

| Time | Acid Treated With Ferrosilicon Dust | | | Acid Treated With Phosphatic Waste Clay | | |
|---|---|---|---|---|---|---|
| (hrs) | $P_2O_5$ | F | P/F | $P_2O_5$ | F | P/F |
| 0.0 | 54.10 | 1.36 | 17.4 | 53.01 | 1.37 | 16.9 |
| 1.0 | 51.61 | 0.79 | 28.5 | 49.68 | 0.65 | 33.4 |
| 2.0 | 52.47 | 0.58 | 40.0 | 52.88 | 0.53 | 43.5 |
| 3.0 | 53.29 | 0.50 | 46.5 | 52.30 | 0.44 | 51.9 |
| 4.0 | 53.55 | 0.47 | 49.7 | 52.81 | 0.39 | 59.0 |
| 5.0 | 53.99 | 0.41 | 57.5 | 52.36 | 0.36 | 63.5 |
| 6.0 | 53.95 | 0.38 | 62.0 | 54.62 | 0.33 | 72.2 |
| 7.0 | 54.42 | 0.33 | 72.0 | 54.27 | 0.31 | 76.4 |
| 8.0 | 54.18 | 0.30 | 78.8 | 54.08 | 0.29 | 81.4 |
| 9.0 | 53.73 | 0.27 | 86.8 | 53.94 | 0.26 | 90.5 |
| 10.0 | 53.87 | 0.25 | 93.8 | 53.59 | 0.23 | 101.7 |
| 11.0 | 54.03 | 0.21 | 112 | 53.67 | 0.20 | 117 |
| 12.0 | 54.16 | 0.17 | 139 | 53.53 | 0.16 | 146 |
| 13.0 | 54.23 | 0.14 | 169 | (Not Measured) | | |

The data illustrates the superior defluorination effectiveness of the invention, even with ROP acid.

Analysis of the starting ROP acids and resulting treated acids (12 or 13 hours treatment) were as follows:

|  | Ferrosilicon Dust | | Phosphatic Waste Clay | |
|---|---|---|---|---|
|  | Starting | Final | Starting | Final |
| $P_2O_5$, wt % | 54.10 | 54.23 | 53.01 | 53.53 |
| F, wt % | 1.36 | 0.14 | 1.37 | 0.16 |
| CaO, wt % | 0.15 | 0.12 | 0.35 | 0.71 |
| $Al_2O_3$, wt % | 1.72 | 1.73 | 1.46 | 2.21 |
| $Fe_2O_3$, wt % | 1.74 | 1.68 | 1.56 | 1.55 |
| MgO, wt % | 0.83 | 0.83 | 0.77 | 1.01 |

The data illustrates the superior performance of the method of the invention.

Although preferred embodiments of this invention have been discussed herein, those skilled in the art will appreciate that changes and modifications may be made without departing from the spirit of this invention, as defined in and limited only by the scope of the appended claims.

We claim:

1. A method for defluorinating phosphoric acid containing fluoride which comprises heating a mixture of said phosphoric acid and silica-containing phosphatic waste clay recovered from phosphate rock beneficiation at a temperature and for a time sufficient to reduce the fluoride concentration of the acid.

2. The method of claim 1 wherein the $P_2O_5$ concentration in the phosphoric acid is at least about 30 wt. percent.

3. The method of claim 2 wherein the $P_2O_5$ concentration in the phosphoric acid is between about 40 and 60 wt. percent.

4. The method of claim 1 wherein the quantity of phosphatic waste clay provides at least the quantity of silica stoichiometrically required to remove all fluoride from the phosphoric acid.

5. The method of claim 3 wherein the quantity of phosphatic waste clay provides at least the quantity of silica stoichiometrically required to remove all fluoride from the phosphoric acid.

6. The method of claim 1 wherein the mixture is heated under a vacuum of at least about 20 inches Hg.

7. The method of claim 5 wherein the mixture is heated under a vacuum of at least about 20 inches Hg.

8. The method of claim 6 wherein the mixture is heated to a temperature between about 200° F. and the boiling point of the mixture.

9. The method of claim 8 wherein the mixture is heated to a temperature between about 225° F. and the boiling point of the mixture.

10. The method of claim 9 wherein the mixture is heated to a temperature between about 250° F. and the boiling point of the mixture.

11. The method of claim 7 wherein the mixture is heated to a temperature between about 225° F. and the boiling point of the mixture.

12. The method of claim 1 wherein the P/F mol ratio of the defluorinated acid is at least about 100.

13. The method of claim 5 wherein the P/F mol ratio of the defluorinated acid is at least about 100.

14. The method of claim 10 wherein the P/F mol ratio of the defluorinated acid is at least about 100.

15. A method for defluorinating phosphoric acid having a $P_2O_5$ concentration of at least about 30 wt. percent and containing fluoride, said method comprising heating under at least about 20 inches Hg vacuum a mixture of silica-containing phosphatic waste clay recovered from phosphate rock beneficiation and said phosphoric acid at a temperature between about 200° F. and the boiling point of said mixture for a time sufficient to reduce the fluoride concentration of the acid.

16. The method of claim 15 wherein the quantity of phosphatic waste clay provides at least the quantity of silica stoichiometrically required to remove all fluoride from the phosphoric acid.

17. The method of claim 16 wherein the quantity of phosphatic waste clay provides a stoichiometric excess between 20 and 80 percent of silica.

18. The method of claim 15 wherein the P/F mol ratio of the defluorinated acid is at least about 100.

19. The method of claim 17 wherein the P/F mol ratio of the defluorinated acid is at least about 100.

* * * * *

UNITED STATES PATENT AND TRADEMARK OFFICE
CERTIFICATE OF CORRECTION

PATENT NO. : 5,002,744

DATED : March 26, 1991

INVENTOR(S) : J. E. Gliksman; D. H. Michalski; R. L. Wiegel

It is certified that error appears in the above-identified patent and that said Letters Patent is hereby corrected as shown below:

Column 3, line 16, "iron-containing" should read -- ion-containing --.

Signed and Sealed this

Eighteenth Day of August, 1992

Attest:

DOUGLAS B. COMER

Attesting Officer

Acting Commissioner of Patents and Trademarks